(12) United States Patent
Guo

(10) Patent No.: US 12,364,250 B2
(45) Date of Patent: Jul. 22, 2025

(54) CAT TEASER FOR ATTRACTING PETS EASILY

(71) Applicant: Kemi Intelligent Manufacturing (Shenzhen) Co., Ltd., Shenzhen (CN)

(72) Inventor: Meng Guo, Shenzhen (CN)

(73) Assignee: Kemi Intelligent Manufacturing (Shenzhen) Co., Ltd., Shenzhen (CN)

( * ) Notice: Subject to any disclaimer, the term of this patent is extended or adjusted under 35 U.S.C. 154(b) by 99 days.

(21) Appl. No.: 18/404,063

(22) Filed: Jan. 4, 2024

(65) Prior Publication Data

US 2024/0268349 A1 Aug. 15, 2024

(30) Foreign Application Priority Data

Feb. 10, 2023 (CN) .......................... 202320234583.9
May 10, 2023 (CN) .......................... 202321118927.6

(51) Int. Cl.
*A01K 15/02* (2006.01)
(52) U.S. Cl.
CPC .................................. *A01K 15/025* (2013.01)
(58) Field of Classification Search
CPC .............................. A01K 15/025; A63H 13/20
See application file for complete search history.

(56) References Cited

U.S. PATENT DOCUMENTS

| | | | | |
|---|---|---|---|---|
| 708,358 | A * | 9/1902 | Honrath | A63H 13/20 446/246 |
| 718,721 | A * | 1/1903 | Nelson | A63H 13/20 40/493 |
| 2,246,965 | A * | 6/1941 | Yoder | A01K 15/025 446/361 |
| 6,510,817 | B2 * | 1/2003 | Horvath | A01K 15/025 119/711 |
| 6,568,353 | B2 * | 5/2003 | Van Sluis | A01K 15/025 119/702 |
| 6,571,742 | B1 * | 6/2003 | Tsengas | A01K 15/025 119/707 |
| 7,806,085 | B1 * | 10/2010 | Waddy | A01K 15/025 119/702 |
| 8,109,239 | B1 * | 2/2012 | Smestad | A01K 15/025 119/702 |
| 10,856,527 | B1 * | 12/2020 | Kreischer | A01K 15/021 |
| 10,863,720 | B1 * | 12/2020 | Tsengas | A01K 15/025 |
| 10,869,461 | B1 * | 12/2020 | Kreischer | A01K 15/025 |

FOREIGN PATENT DOCUMENTS

KR 900007156 Y1 * 8/1990

* cited by examiner

*Primary Examiner* — Magdalena Topolski
(74) *Attorney, Agent, or Firm* — Westbridge IP LLC

(57) ABSTRACT

A cat teaser for attracting pets easily includes an upper support shell and a lower support shell. Several openings are formed at the edges after the upper support shell and the lower support shell are snap-fitted with each other, a second motor is mounted at the bottom of the lower support shell, a telescopic head assembly is provided between the upper support shell and the lower support shell, and a rotating shaft of the second motor passes through the lower support shell to drive the telescopic head assembly to rotate; the telescopic head assembly includes a first arm, a swing arm spring, and a second arm connected in sequence, and the first arm is connected to the rotating shaft of the second motor.

20 Claims, 6 Drawing Sheets

CAT TEASER FOR ATTRACTING PETS EASILY

CROSS-REFERENCE TO RELATED APPLICATIONS

This application claims priority to Chinese Patent Application No. 202320234583.9, filed on Feb. 10, 2023, and Chinese Patent Application No. 202321118927.6, filed on May 10, 2023. All of the aforementioned applications are incorporated herein by reference in their entireties.

TECHNICAL FIELD

The present application relates to the technical field of pet toys, more particularly to a cat teaser for attracting pets easily.

BACKGROUND

Pet toys are indispensable products for pet owners. When we are busy, we don't have time or energy to play with our own pets. Therefore, we need a product to attract their attention, play with them to ease the anxiety of pets, and at the same time, consume their excessive energy to avoid disturbing what we are doing at this time. However, the existing pet toys are generally cat-teasing rods and cat-teasing balls, and both cat-teasing rods and cat-teasing balls remain exposed. After playing for a period of time, pets will gradually lose their interest. So the two cannot continue to grasp the pets' curiosity. That is, the current cat teasers have limited appeal to pets and find it difficult to maintain the attraction.

SUMMARY

The technical problem to be solved by the present application is to provide a cat teaser that attracts a pet easily.

In order to solve the above technical problems, the technical solutions adopted by the present application are below: a cat teaser for attracting pets easily, comprising an upper support shell and a lower support shell, where the upper support shell and the lower support shell are snap-fitted with each other to form several openings at edges, one second motor is mounted at a bottom of the lower support shell, a telescopic head assembly is provided between the upper support shell and the lower support shell, and a rotating shaft of the second motor passes through the lower support shell to drive the telescopic head assembly to rotate; the telescopic head assembly comprises a first arm, a swing arm spring, and a second arm connected in sequence, and the first arm is connected to the rotating shaft of the second motor; when the second motor rotates, the rotating shaft of the second motor successively drives the first arm, the swing arm spring, and the second arm to rotate, the swing arm spring and the second arm extending or folding relative to the first arm, and the second arm extending out of or retracting from the opening; and after the second motor rotates to another angle, the second arm extends or folds again relative to the first arm, and the second arm transfers from one opening to another opening.

The advantageous effects of the present application are that the cat teaser has a novel structure, and the telescopic head assembly can extend out of different openings to capture the attention of cats and other pets. At the same time, under the driving of the second motor, the swing arm spring can fold or extend, allowing the telescopic head assembly to withdraw to achieve hiding or extending from another opening, thereby keeping cats and other pets focused and making pets more easily attracted.

In addition, according to the cat teaser, the extension and retraction of the telescopic head assembly can be achieved merely by the forward and reverse rotation of the second motor, and more cat teasing angles and more random cat teasing opportunities can be obtained.

DETAILED DESCRIPTION OF THE EMBODIMENTS

Figure 1:
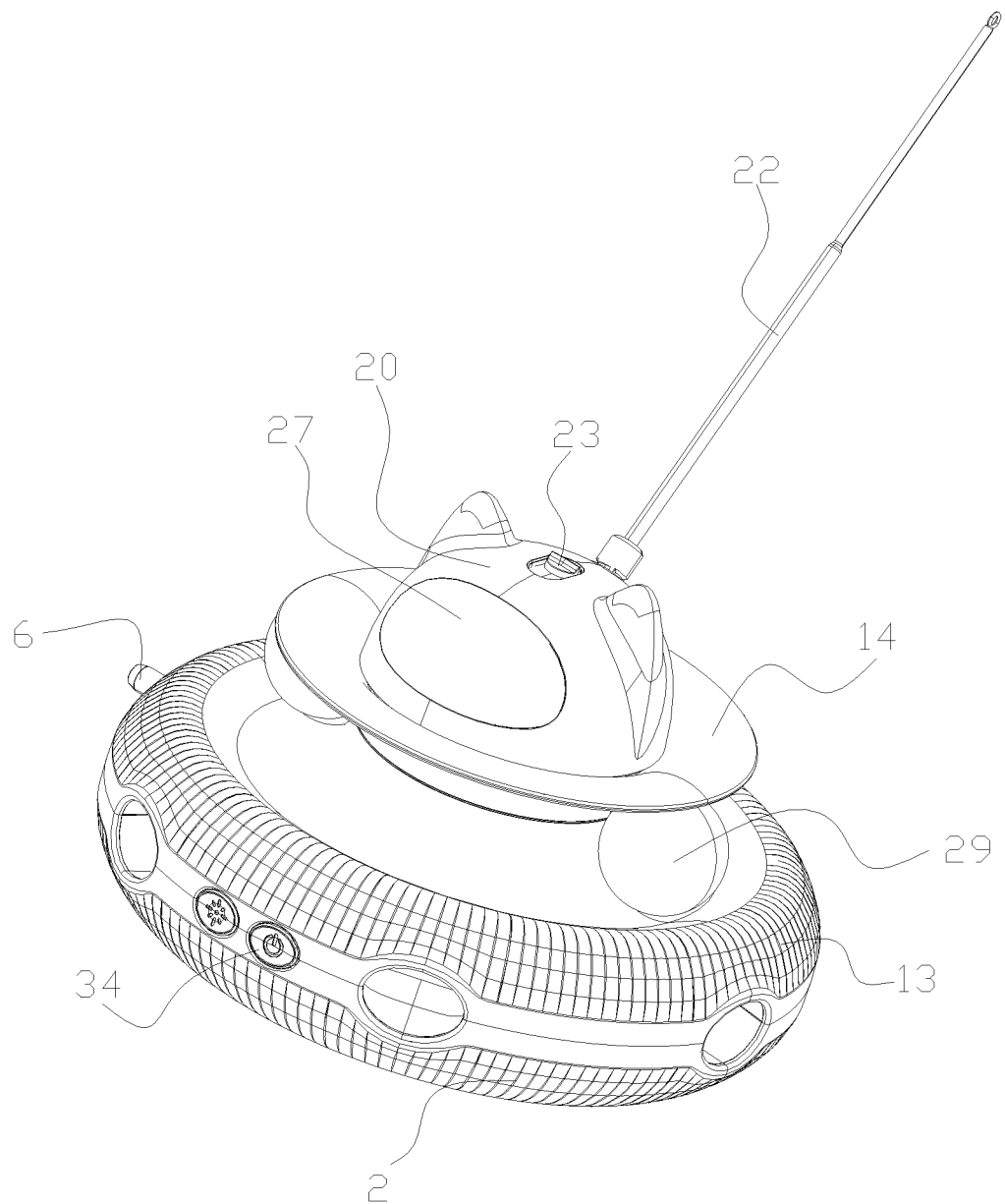
FIG. 1 is a stereogram of the present application.
Figure 2:
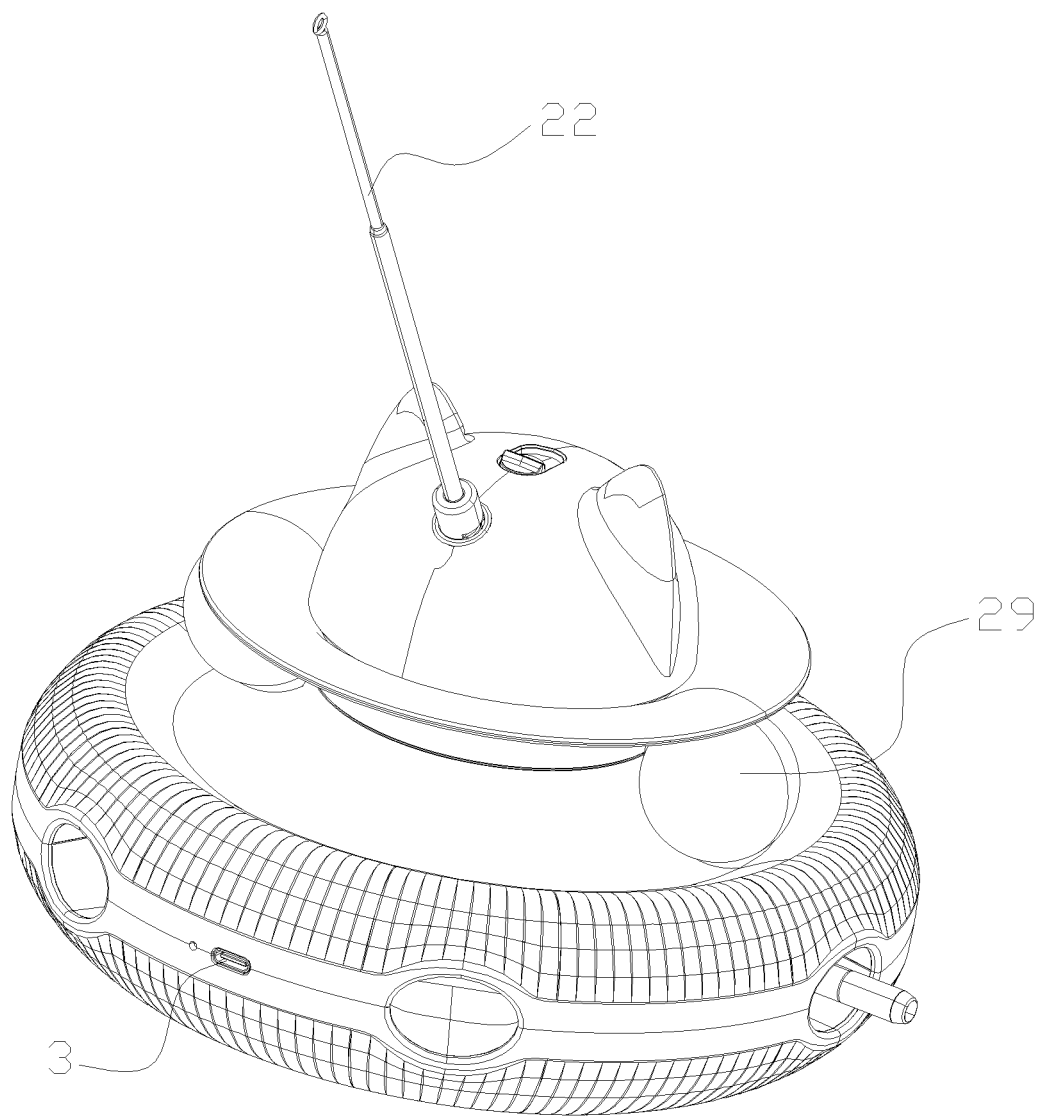
FIG. 2 is a stereogram from another angle of the present application.

The present application will be described in further detail below with reference to the accompanying drawings and embodiments. It should be understood that the specific embodiments described herein are illustrative of the present application only instead of being restrictive. It should also be noted that, for case of description, only some parts, but not all, of the structures associated with the present application are shown in the drawings.

In the description of the present application, unless otherwise clearly specified and limited, the terms "connected", "connect", and "fix" should be understood in a broad sense. For example, it can be a fixed connection or a detachable connection, or integrated; it can be a mechanical connection, or an electrical connection; it can be directly connected or indirectly connected through an intermediate medium, and it can be the internal communication of two elements or the interaction relationship between two elements. For a person of ordinary skills in the art, the specific meaning of the above-mentioned terms in the present application can be understood according to specific situations.

In the present application, unless otherwise clearly specified and limited, the first feature being "above" or "below" the second feature may include the direct contact between the first feature and second feature, or may include the situation that the first feature and the second feature are not in direct contact but are connected through another feature therebetween. Further, the first feature being "above", "on" and "beyond" the second feature includes that the first feature is directly above and obliquely above the second feature, or merely indicates that the first feature is at a higher level than the second feature. The first feature being "below", "under" and "beneath" the second feature includes that the first feature is directly below and obliquely below the second feature, or simply indicates that the first feature is at a lower level than the second feature.

In the description of the present embodiment, the orientation or positional relationships indicated by the terms "up", "down", "front", "back", "left", "right", etc. are based on the orientation or positional relationship shown in the drawings, and are only for the convenience of descriptions and simplifying the operations, rather than indicating or implying that the referred device or element must have a specific orientation, or be constructed and operated in a specific orientation, and therefore cannot be construed as a limitation of the present application. Furthermore, the terms "first" and "second" are used merely to distinguish one from another in a descriptive sense and not in a specific sense.

Embodiment 1

As shown in FIGS. 1-6, embodiment 1 of the present application provides a laser cat teaser, including: a laser head 26, a laser bracket 25, a rotating bracket 18, a slip ring 17, several laser conducting pieces 28, and a first motor; the bottom of the rotating bracket 18 is provided on the rotating shaft of the first motor, the laser bracket 25 is provided on the rotating bracket 18, the laser head 26 is mounted to the laser bracket 25, and the laser head 26 can rotate automatically and can adjust the pitch angle of the laser projection under the driving of the first motor; the slip ring 17 is provided at the bottom of the rotating bracket 18 to rotate together with the rotating bracket 18, and one laser conducting piece 28 is provided each annular metal ring corresponding to the bottom of the slip ring 17 for contacting with it so as to ensure the electrical connection between the the laser conducting piece 28 and the slip ring 17 during the rotation of the slip ring 17; and thus, as the first motor rotates, the light emitted by the laser head 26 also moves in position, thereby achieving the purpose of cat teasing.

The first motor is also electrically connected to a main control board 11, and the main control board 11 is used for controlling the rotation of the first motor. The main control board 11 is also connected to a battery 4. The main control board 11 is also connected to a charging panel 3, and a charging interface is provided on the charging panel 3. The front end of the laser bracket 25 is rotatably mounted to the front end of a fixed frame 24, and the rear end of the laser bracket 25 is mounted in a sliding groove provided on a toggle key 23. The sliding groove is obliquely provided with one side close to the laser bracket 25 high and one side away from the laser bracket 25 low, so that the angle of inclination of the laser bracket 25 can be adjusted by moving the toggle key 23 back and forth, thereby adjusting the angle irradiated by the laser head 26.

A bearing cover 12 is also sheathed on the rotating shaft of the first motor, a lower end of the rotating bracket 18 also has a mounting column, the mounting column is mounted to the rotating shaft of the first motor, the bearing cover 12 is fixed on the mounting column by two bolts, the outer side of the mounting column is further mounted to a bearing 15, and a C-shaped snap spring 16 is further provided on the mounting column between the bearing 15 and the bottom of the rotating bracket 18.

A top cover 20 is also mounted to the rotating bracket 18, and the top cover 20 buckles the laser head 26 and the laser bracket 25 therein. The top cover 20 is further provided with a PC lens 27 at a position corresponding to the laser head 26.

The first motor is mounted inside a middle shell 13, and the lower end of the middle shell 13 also has a bottom shell 2 which is snap-fitted with it; a flared upper shell 14 is also mounted to the top of the middle shell 13; an upper support shell 10 and a lower support shell 5 which are snap-fitted with each other are further provided between the middle shell 13 and the bottom shell 2; the upper support shell 10 and the lower support shell 5 form several openings at the edges after being snap-fitted with each other; a second motor is mounted at the bottom of the lower support shell 5, and the second motor is electrically connected to the main control board 11; a telescopic head assembly is provided between the upper support shell 10 and the lower support shell 5; a rotating shaft of the second motor passes through the lower support shell 5 to be between the upper support shell 10 and the lower support shell 5 so as to drive the telescopic head assembly to rotate; the telescopic head assembly includes a first arm, a swing arm spring 8, and a second arm which are connected in sequence; the first arm is connected to the rotating shaft of the second motor; when the second motor rotates, the rotating shaft of the second motor drives the first arm, the swing arm spring 8, and the second arm to rotate in sequence; the swing arm spring 8 and the second arm extend or fold relative to the first arm, and the second arm extends out of or retracts from the opening; and after the second motor rotates to another angle, the second arm extends or folds again relative to the first arm, and the second arm transfers from one opening to another opening. Preferably, the telescopic head assembly further comprises feathers provided on the second arm.

Figure 3:
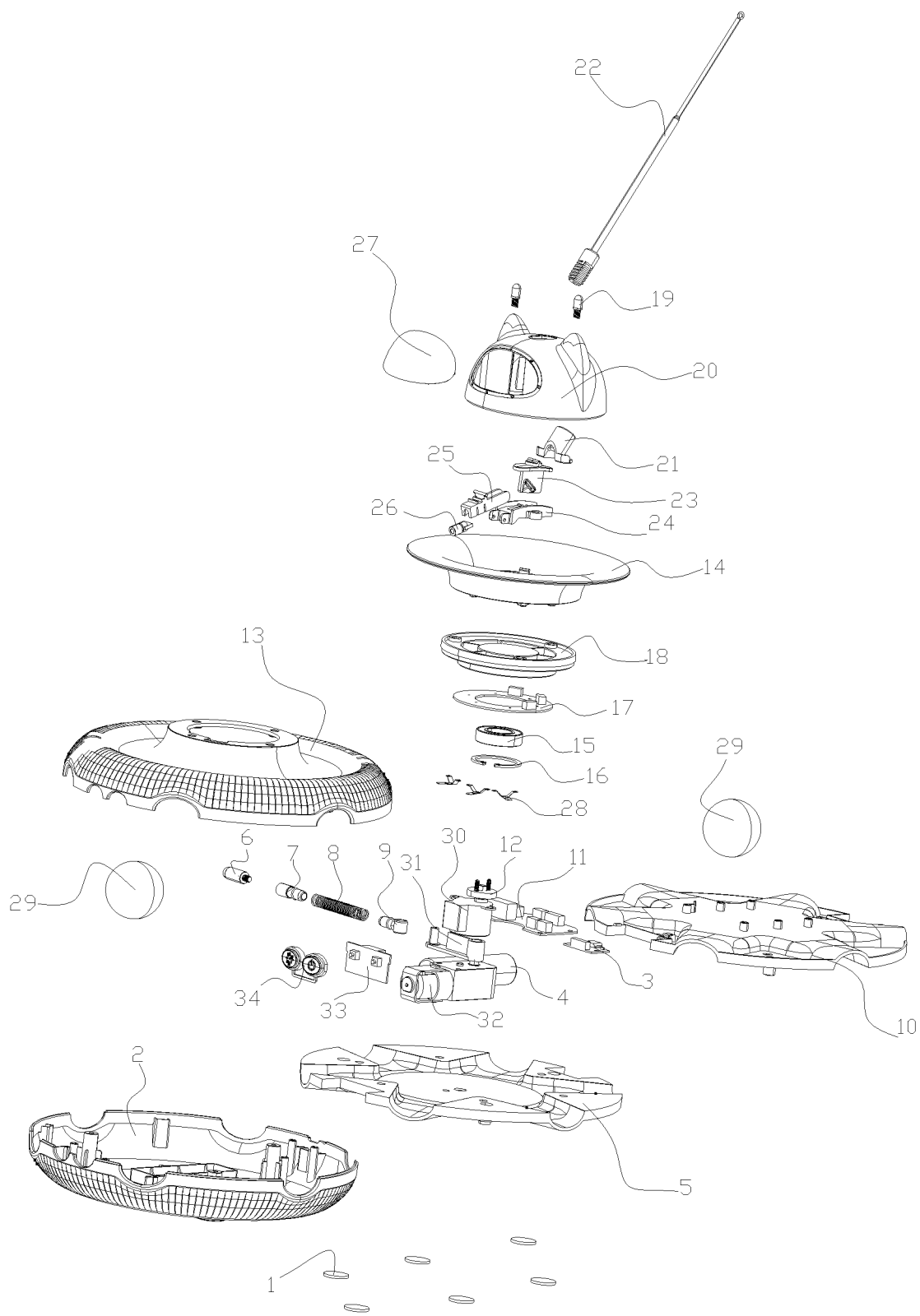
FIG. 3 is an explosive view of the present application.
Figure 4:
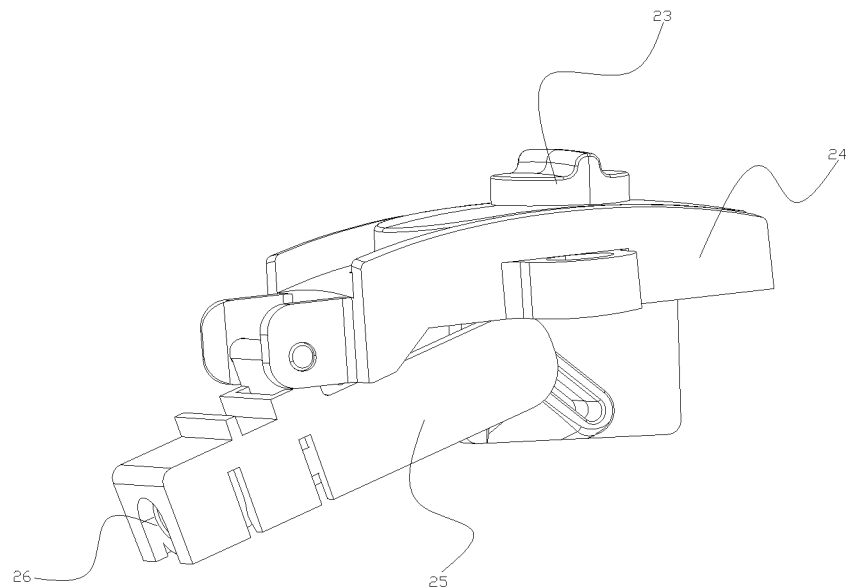
FIG. 4 is a structural diagram of an assembly for adjusting the tilt angle of a laser head according to the present application.
Figure 5:
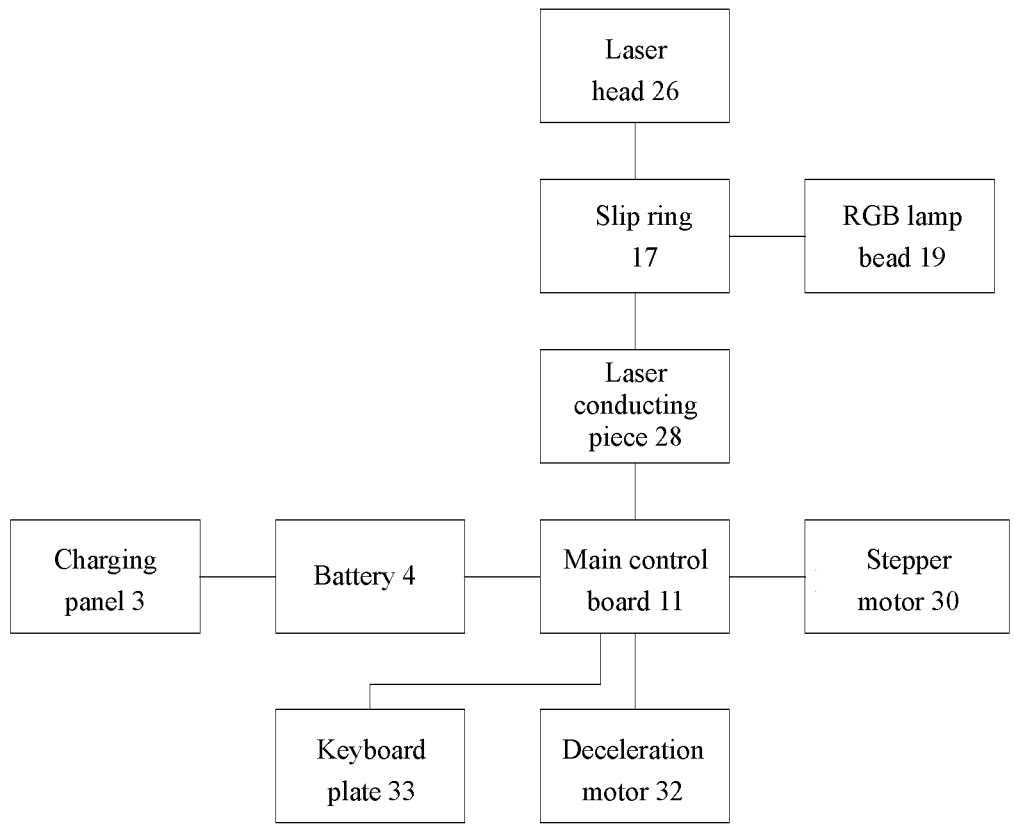
FIG. 5 is an electrical connection relational graph of the present application.

Further, as shown in FIG. 3, several guiding grooves are provided between the upper support shell 10 and the lower support shell 6, the ends of the guiding grooves form the openings, the calibers of the guiding grooves are gradually reduced from one end away from the opening towards one end near the opening, and such a reducing guiding groove can guide the telescopic head assembly so that the second arm can be extended and retracted more smoothly. Preferably, a boss is provided in a central region of one side of the lower support shell close to the upper support shell, and one end of the bottom surface of the guiding groove away from the opening is provided lower than the boss, so that the phenomenon that the telescopic head assembly cannot be extended again due to its locking after it is retracted can be prevented, and it is ensured that the swing arm spring 8 can be smoothly extended and folded, which is beneficial for improving the working stability of the telescopic head assembly.

In this embodiment, the first arm includes a big arm 31 and a small arm 9 rotatably connected. The big arm 31 is fixedly connected to the rotating shaft of the second motor, and the small arm 9 is connected to the swing arm spring 8. The second arm includes a telescopic head 7 and a replacement head 6 connected. The telescopic head 7 is connected to the swing arm spring 8, and the replacement head 6 is provided with feathers. Preferably, the telescopic head 7 is detachably connected to the replacement head 6, so that the user can change the cat teasing decoration of the telescopic head assembly himself.

When the second motor rotates, the rotating shaft of the second motor successively drives the big arm 31, the small arm 9, the swing arm spring 8, the telescopic head 7, and the replacement head 6 to rotate, and the swing arm spring 8 extends or folds, so that as the second motor rotates, the replacement head 6 transfers from one opening formed by the edges after the upper support shell 10 and the lower support shell 5 are snap-fitted with each other to another opening, and feathers and the like provided on the replacement head 6 can effectively attract the attention of pets.

One telescopic rod base 21 is further provided on the top cover 20, and a cat-teasing rod 22 is mounted to the telescopic rod base 21; and the cat teaser rod 22 is provided with feathers or the like for attracting the attention of pets. Several RGB lamp beads 19 are further provided inside the top cover 20, and the RGB lamp beads 19 are sequentially connected to the main control board 11 via the slip ring 17 and the laser conducting piece 28; the middle shell 13 and the bottom shell 2 are further provided with a key 34 at the mutual fastening part, the back face of the key 34 is correspondingly provided with a keyboard plate 33, and the keyboard plate 33 is connected to the main control board 11; several cat-teasing balls 29 are further provided between the middle shell 13 and the upper shell 14 for teasing cats; the bottom of the bottom shell 2 is also provided with several silica gel pads 1; and the first motor is a stepper motor 30, and the second motor is a deceleration motor 32.

Figure 6:
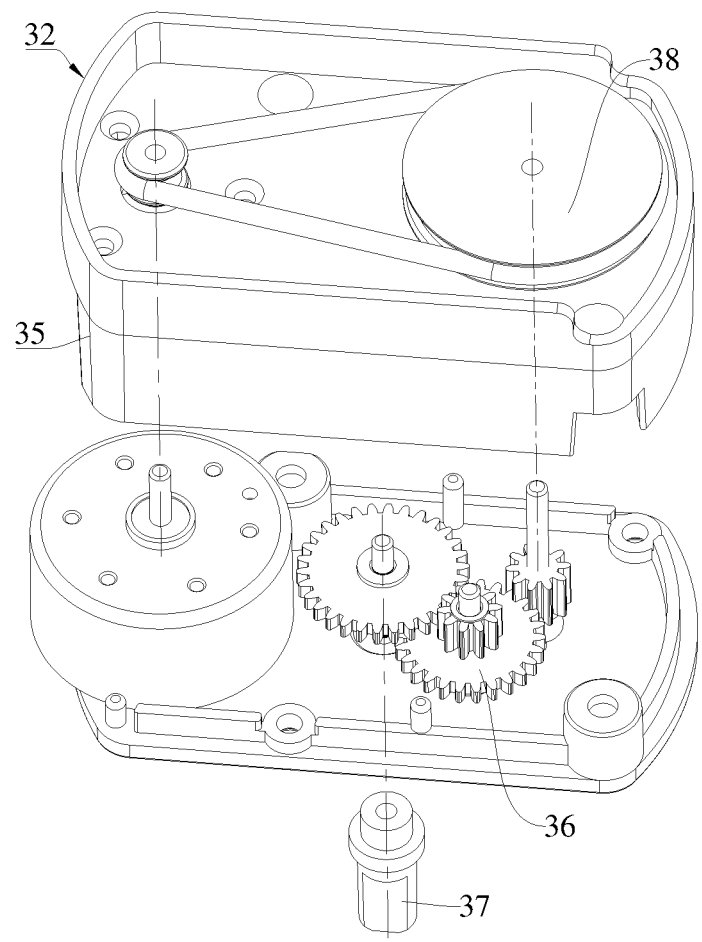
FIG. 6 is an explosive view of a deceleration motor in an embodiment of the present application.

In some embodiments, as shown in FIG. 6, optionally, the deceleration motor 32 comprises a box body 35 and a motor structure and a deceleration structure respectively provided in the box body 35; the deceleration structure comprises several deceleration gears 36 rotatably mounted to the box body, an output shaft of the motor structure is in drive joint with the deceleration gears 36, a mounting shaft 37 is mounted to a shaft portion of the deceleration gears 36, and the mounting shaft 37 is exposed to the box body to form the rotating shaft of the second motor. Specifically, the number of the deceleration gears 36 is multiple, two of the deceleration gears 36 in contact mesh with each other, a shaft portion of one of the deceleration gears 36 is provided with a driving disc 38, an output shaft of the motor structure is in drive joint with the driving disc 38 via a driving belt or a driving chain, the driving disc 38 is a toothed disc or a wheel disc, and a bottom end of the box body 35 is provided with an accommodating groove for accommodating the driving disc 38. The motor structure and the driving disc 38 are provided apart from each other, and the mounting shaft 37 is provided corresponding to a region between the motor structure and the driving disc 38, so that the overall volume of the deceleration motor can be reduced. Alternatively, the number of the deceleration gears is three, that is, the deceleration structure is a three-stage deceleration mechanism.

The principle of this embodiment is as follows: the bottom of the rotating bracket 18 is provided on the rotating shaft of the stepper motor 30, the laser bracket 25 is provided on the rotating bracket 18, and the laser head 26 is mounted to the laser bracket 25; the slip ring 17 is provided at the bottom of the rotating bracket 18 to rotate together with the rotating bracket 18, and one laser conducting piece 28 is provided on each annular metal ring corresponding to the bottom of the slip ring 17 to be in contact with it, so as to ensure the electrical connection between the laser conducting piece 28 and the slip ring 17 during the rotation of the slip ring 17; and in this manner, as the stepper motor 30 rotates, the light emitted by the laser head 26 will also move in position for the purpose of teasing a cat.

One deceleration motor 32 is mounted to the bottom of the lower support shell 5, a rotating shaft of the deceleration motor 32 passes through the lower support shell 5 to be between the upper support shell 10 and the lower support shell 5, a big arm 31 is also mounted to the rotating shaft of the deceleration motor 32, one small arm 9 is rotatably mounted to the big arm 31, a swing arm spring 8 is mounted to the small arm 9, a telescopic head 7 is mounted to the other end of the swing arm spring 8, and a replacement head 6 is mounted to the other end of the telescopic head 7; when the deceleration motor 32 rotates, the rotating shaft of the deceleration motor 32 drives the big arm 31, the small arm 9, the swing arm spring 8, the telescopic head 7, and the replacement head 6 to rotate in sequence, and the swing arm spring 8 extends or folds so that the replacement head 6 is transferred from one opening formed by the edges after the upper support shell 10 and the lower support shell 5 are snap-fitted to another opening as the deceleration motor 32 rotates.

Embodiment 2

Figure 7:
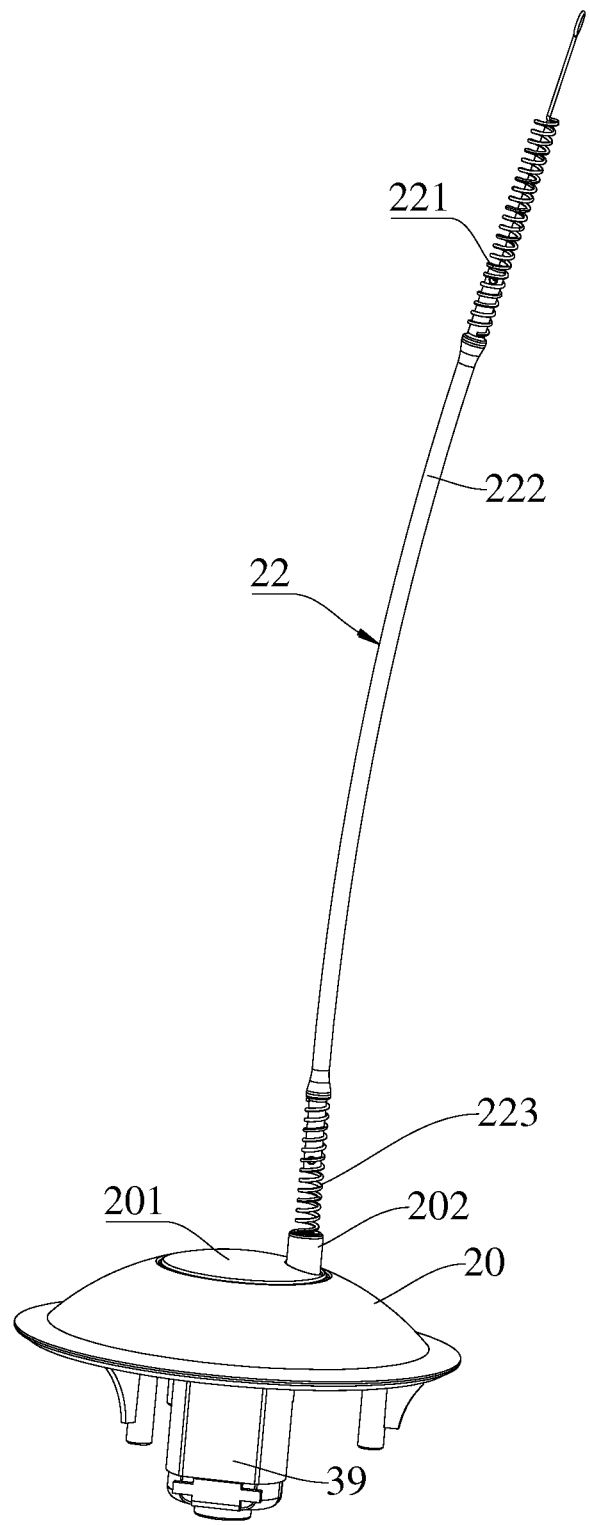
FIG. 7 is a schematic view showing the structure of the partial structure of a cat teaser according to an embodiment of the present application.

With reference to FIG. 7, embodiment 2 of the present application is a parallel technical solution of embodiment 1, which differs from embodiment 1 in that the structure of the cat-teasing rod is different, specifically as follows.

The cat teaser rod 22 comprises a first spring 221, a push rod 222, and a second spring 223 which are successively connected. The first spring 221 is used for mounting a decoration, the second spring 223 is connected to the top cover 20, and the decoration can be a gauze butterfly, feather, etc.; such a cat teaser rod structure is not easily broken when the pet pulls; and when the pet releases the cat teaser rod 22, the cat teaser rod 22 can spring back and recover, so as to extend the service life of the cat teaser rod 22.

The top cover 20 is provided thereon with a threaded head 202 for connecting with the second spring 223, and the second spring 223 is rotatably provided with respect to the threaded head 202; preferably, the top cover 20 includes a body having a window and a rotating cover 201 rotatably provided at the window; in the present embodiment, the threaded head 202 is provided on the rotating cover 201, and a third motor 39 is further provided on the inner side of the top cover 20, where the third motor 39 is used for driving the rotating cover 201 to rotate, and the second spring 223 is connected to the rotating cover 201; and the connection of the second spring 223 with the rotating cover 201 is provided offset from the rotating center axis of the rotating cover 201. The third motor 39 drives the rotating cover 201 to rotate, the rotating cover 201 drives the cat teaser rod 22 to rotate, and the second spring 223 and the threaded head 202 have one rotation speed under the influence of gravity. When the two rotations are added together, the cat-teasing rod 22 will have the effect of rotating while shaking up and down, thus creating a greater attraction to the pet.

The above descriptions are only embodiments of the present application, and are not intended to limit the scope of the present application. Any equivalent transformations made by using the contents of the description and drawings of the present application, or directly or indirectly applied in related technical fields, are similarly included in the scope of the present application.

What is claimed is:

1. A cat teaser for attracting pets easily, comprising an upper support shell and a lower support shell, wherein
the upper support shell and the lower support shell are snap-fitted with each other to form several openings at edges, one second motor is mounted at a bottom of the lower support shell, a telescopic head assembly is provided between the upper support shell and the lower support shell, and a rotating shaft of the second motor passes through the lower support shell to drive the telescopic head assembly to rotate;
the telescopic head assembly comprises a first arm, a swing arm spring, and a second arm connected in sequence, and the first arm is connected to the rotating shaft of the second motor;
when the second motor rotates, the rotating shaft of the second motor successively drives the first arm, the swing arm spring, and the second arm to rotate, the swing arm spring and the second arm extending or folding relative to the first arm, and the second arm extending out of or retracting from the opening; and after the second motor rotates to another angle, the second arm extends or folds again relative to the first arm, and the second arm transfers from one opening to another opening.

2. The cat teaser for attracting pets easily according to claim 1, wherein the telescopic head assembly further comprises feathers provided on the second arm.

3. The cat teaser for attracting pets easily according to claim 1, wherein several guiding grooves are provided between the upper support shell and the lower support shell, and ends of the guiding grooves form the openings.

4. The cat teaser for attracting pets easily according to claim 3, wherein the guiding groove has a caliber gradually decreasing from one end away from the opening towards one end close to the opening.

5. The cat teaser for attracting pets easily according to claim 3, wherein the lower support shell is provided with a boss at a central region close to one side of the upper support shell, and one end of a bottom surface of the guiding groove away from the opening is provided lower than the boss.

6. The cat teaser for attracting pets easily according to claim 1, wherein the first arm comprises a big arm and a small arm rotatably connected, the big arm is fixedly connected to the rotating shaft of the second motor, and the small arm is connected to the swing arm spring.

7. The cat teaser for attracting pets easily according to claim 1, wherein the second arm comprises a telescoping head and a replacement head connected, the telescopic head is connected to the swing arm spring.

8. The cat teaser for attracting pets easily according to claim 7, wherein the telescopic head is detachably connected to the replacement head.

9. The cat teaser for attracting pets easily according to claim 1, wherein the second motor is a deceleration motor.

10. The cat teaser for attracting pets easily according to claim 9, wherein the deceleration motor comprises a box body and a motor structure and a deceleration structure respectively provided in the box body, the deceleration structure comprises several deceleration gears rotatably mounted to the box body, an output shaft of the motor structure is in drive joint with the deceleration gears, a mounting shaft is mounted to a shaft portion of one of the deceleration gears, and the mounting shaft is exposed to the box body to form the rotating shaft of the second motor.

11. The cat teaser for attracting pets easily according to claim 10, wherein the number of the deceleration gears is multiple, two deceleration gears in contact mesh with each other, the shaft portion of one of the deceleration gears is provided with a driving disc, and the output shaft of the motor structure is in drive joint with the driving disc through a driving belt or a driving chain.

12. The cat teaser for attracting pets easily according to claim 11, wherein the driving disc is a toothed disc or a wheel disc, and a bottom end of the box body is provided with an accommodating groove for accommodating the driving disc.

13. The cat teaser for attracting pets easily according to claim 11, wherein the motor structure and the driving disc are provided away from each other.

14. The cat teaser for attracting pets easily according to claim 1, further comprising a laser head, a laser bracket, a rotating bracket, a slip ring, several laser conducting pieces, and a first motor, wherein a bottom of the rotating bracket is provided on a rotating shaft of the first motor, the laser bracket is provided on the rotating bracket, and the laser head is mounted to the laser bracket; and the slip ring is provided at the bottom of the rotating bracket to rotate together with the rotating bracket, and one laser conducting piece is provided on each annular metal ring corresponding to a bottom of the slip ring to be in contact with it, so as to ensure an electrical connection between the laser conducting piece and the slip ring during a rotation of the slip ring.

15. The cat teaser for attracting pets easily according to claim 14, wherein a front end of the laser bracket is rotatably mounted to a front end of a fixed frame, and a rear end of the laser bracket is mounted in a sliding groove provided on one toggle key; and the sliding groove is inclinedly provided with one side close to the laser bracket high and one side away from the laser bracket low, so that an angle of inclination of the laser bracket is capable of being adjusted by moving the toggle key front and back, thereby adjusting an angle of irradiation of the laser head.

16. The cat teaser for attracting pets easily according to claim 14, wherein the first motor is mounted inside a middle shell, a lower end of the middle shell has a bottom shell snap-fitted with the middle shell, one flared upper shell is further mounted to a top of the middle shell, and several cat-teasing balls are further provided between the middle shell and the upper shell; and the upper support shell and the lower support shell are located between the middle shell and the bottom shell.

17. The cat teaser for attracting pets easily according to claim 14, wherein one top cover is further mounted on the rotating bracket, and one cat-teasing rod is further provided on the top cover.

18. The cat teaser for attracting pets easily according to according to claim 17, wherein the cat-teasing rod comprises a first spring for mounting a decoration, a push rod, and a second spring connected in sequence, the second spring is connected to the top cover.

19. The cat teaser for attracting pets easily according to claim 18, wherein the top cover comprises a body having a window and a rotating cover rotatably provided at the window, and a third motor is provided on an inner side of the top cover for driving the rotating cover to rotate; and the second spring is connected to the rotating cover, and a connection of the second spring and the rotating cover is provided offset from a rotation center axis of the rotating cover.

20. The cat teaser for attracting pets easily according to claim 18, wherein the top cover is provided thereon with a threaded head for connecting the second spring.

* * * * *